United States Patent
Tardif

(10) Patent No.: US 11,286,319 B2
(45) Date of Patent: Mar. 29, 2022

(54) METHOD OF PRODUCING MULTICOMPONENT COPOLYMER

(71) Applicant: BRIDGESTONE CORPORATION, Tokyo (JP)

(72) Inventor: Olivier Tardif, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/767,714

(22) PCT Filed: Sep. 21, 2018

(86) PCT No.: PCT/JP2018/035185
§ 371 (c)(1),
(2) Date: May 28, 2020

(87) PCT Pub. No.: WO2019/111494
PCT Pub. Date: Jun. 13, 2019

(65) Prior Publication Data
US 2021/0002398 A1    Jan. 7, 2021

(30) Foreign Application Priority Data

Dec. 5, 2017   (JP) .............................. JP2017-233818

(51) Int. Cl.
*C08F 210/18*   (2006.01)
*C08F 4/52*   (2006.01)

(52) U.S. Cl.
CPC ........ *C08F 210/18* (2013.01); *C08F 2800/20* (2013.01)

(58) Field of Classification Search
None
See application file for complete search history.

(56) References Cited

U.S. PATENT DOCUMENTS

| | | |
|---|---|---|
| 5,721,185 A | 2/1998 | Lapointe et al. |
| 6,156,857 A | 12/2000 | Starzewski et al. |
| 6,274,529 B1 | 8/2001 | Fusco et al. |
| 2006/0160969 A1 | 7/2006 | Boisson et al. |
| 2007/0232758 A1 | 10/2007 | Hou et al. |
| 2009/0264604 A1* | 10/2009 | Kaita ................ C07F 17/00 526/126 |
| 2012/0059135 A1 | 3/2012 | Michiue et al. |
| 2013/0197157 A1 | 8/2013 | Kaita et al. |
| 2014/0005296 A1 | 1/2014 | Horikawa et al. |
| 2014/0360573 A1 | 12/2014 | Nishioka et al. |

FOREIGN PATENT DOCUMENTS

| | | |
|---|---|---|
| CN | 104177529 A | 12/2014 |
| EP | 0 771 822 A1 | 5/1997 |
| JP | 05-194641 A | 8/1993 |
| JP | 09-165409 A | 6/1997 |
| JP | 2000-514116 A | 10/2000 |
| JP | 2007-501881 A | 2/2007 |
| JP | 2012-116926 A | 6/2012 |
| JP | 2017-101181 A | 6/2017 |
| WO | 2006/004068 A1 | 1/2006 |
| WO | 2010/113975 A1 | 10/2010 |
| WO | 2012/014455 A1 | 2/2012 |
| WO | 2012/105258 A1 | 8/2012 |
| WO | 2013/118729 A1 | 8/2013 |

OTHER PUBLICATIONS

Machine translation of Detailed Description of CN 104177529A retrieved from ESPACENET on Jun. 9, 2021 (Year: 2014).*
Machine translation of Detailed Description of JP 2012-116926A retrieved from ESPACENET on Jun. 9, 2021 (Year: 2012).*
International Search Report for PCT/JP2018/035185 dated Dec. 18, 2018 (PCT/ISA/210).
International Preliminary Report on Patentability with a Translation of Written Opinion in International Application No. PCT/JP2018/035185, dated Jun. 9, 2020.
Extended European Search Report dated Aug. 6, 2021 in European Application No. 18885710.6.
Tan Rui et al., "The terpolymerization of ethylene and propylene with isoprene via THF-containing half-sandwich scandium catalysts: a new kind of ethylene-propylene-diene rubber and its functionalization", Polymer Chemistry, 2017, vol. 8, No. 32, pp. 4651-4658 (9 pages total).

* cited by examiner

*Primary Examiner* — Fred M Teskin
(74) *Attorney, Agent, or Firm* — Sughrue Mion, PLLC

(57) ABSTRACT

Provided is a method of producing a multicomponent copolymer, in which ethylene, a non-conjugated olefin compound having 3 to 10 carbon atoms, and a conjugated diene compound are copolymerized to produce a multicomponent copolymer. The method of producing a multicomponent copolymer is a method in which ethylene, a non-conjugated olefin compound having 3 to 10 carbon atoms, and a conjugated diene compound are copolymerized to produce a multicomponent copolymer, including a step of copolymerizing the ethylene, the non-conjugated olefin compound, and the conjugated diene compound, in the presence of a polymerization catalyst composition containing a rare earth element compound (component (A)) represented by predetermined formula.

15 Claims, 3 Drawing Sheets

METHOD OF PRODUCING MULTICOMPONENT COPOLYMER

CROSS REFERENCE TO RELATED APPLICATIONS

This application is a National Stage of International Application No. PCT/JP2018/035185 filed Sep. 21, 2018, claiming priority based on Japanese Patent Application No. 2017-233818 filed Dec. 5, 2017.

TECHNICAL FIELD

This disclosure relates to a method of producing a multicomponent copolymer.

BACKGROUND

Rubber products (such as tires, conveyor belts, vibration-insulating rubbers, and seismic isolation rubbers) are generally required to have high durability (such as fracture resistance, wear resistance, and crack growth resistance) and weather resistance. In order to meet such requirements, various rubber components and rubber compositions have been developed.

For example, WO 2012/014455 A1 (PTL 1) describes a copolymer of a conjugated diene compound and a non-conjugated olefin in which a cis-1,4 bond content of a conjugated diene moiety (moiety derived from the conjugated diene compound) is greater than 70.5 mol % and a non-conjugated olefin content is 10 mol % or more. PTL 1 also describes using this copolymer to produce a rubber having good crack growth resistance and good weather resistance.

CITATION LIST

Patent Literature

PTL 1: WO 2012/014455 A1

SUMMARY

Technical Problem

However, this copolymer is a binary copolymer obtained by polymerizing one kind of conjugated diene compound and one kind of non-conjugated olefin compound and tends to have an increased crystallinity due to an increase in the content of the non-conjugated olefin moiety which contributes to the improvement of weather resistance. The increase in crystallinity of the copolymer may deteriorate the physical properties as an elastomer and may impair the workability during the production of, for example, rubber compositions and rubber products using this copolymer (especially in a kneading process during the production of rubber compositions).

It may be conceivable to provide a multicomponent copolymer having a moiety derived from a conjugated diene compound, a moiety derived from ethylene, and a moiety derived from a non-conjugated olefin compound having 3 to 10 carbon atoms, which is a polymer that solves the above-mentioned problems of binary copolymers, contributes to the improvement of durability and weather resistance of rubber compositions and rubber products, and has low crystallinity and excellent workability. However, a method with which such a multicomponent copolymer can be produced by copolymerizing ethylene, a non-conjugated olefin compound having 3 to 10 carbon atoms, and a conjugated diene compound has not been reported It could thus be helpful to provide a method of producing a multicomponent copolymer, in which ethylene, a non-conjugated olefin compound having 3 to 10 carbon atoms, and a conjugated diene compound are copolymerized to produce a multicomponent copolymer.

Solution to Problem

The method of producing a multicomponent copolymer of the present disclosure is a method of producing a multicomponent copolymer, in which ethylene, a non-conjugated olefin compound having 3 to 10 carbon atoms, and a conjugated diene compound are copolymerized to produce a multicomponent copolymer, including a step of copolymerizing the ethylene, the non-conjugated olefin compound, and the conjugated diene compound, in the presence of a polymerization catalyst composition containing a rare earth element compound (component (A)) represented by the following general formula (I):

(where M is a scandium, yttrium or lanthanoid element; Cp is a group selected from the group consisting of a cyclopentadienyl group, an indenyl group, a fluorenyl group, and derivatives thereof; X and X' are a hydrogen atom, a halogen atom, an alkoxide group, a thiolate group, an amide group, a silyl group, or a hydrocarbon group having 1 to 20 carbon atoms, where the hydrocarbon group having 1 to 20 carbon atoms may have a group containing silicon, oxygen, nitrogen, sulfur, or phosphorus at a terminal or between terminals; X and X' may be the same with or different from each other; a and b are each independently an integer from 0 to 3, where a+b≥1; L is a neutral Lewis base; and c is an integer from 0 to 3).

Advantageous Effect

According to the present disclosure, it is possible to provide a method of producing a multicomponent copolymer, in which ethylene, a non-conjugated olefin compound having 3 to 10 carbon atoms, and a conjugated diene compound are copolymerized to produce a multicomponent copolymer.

DETAILED DESCRIPTION

Figure 1:
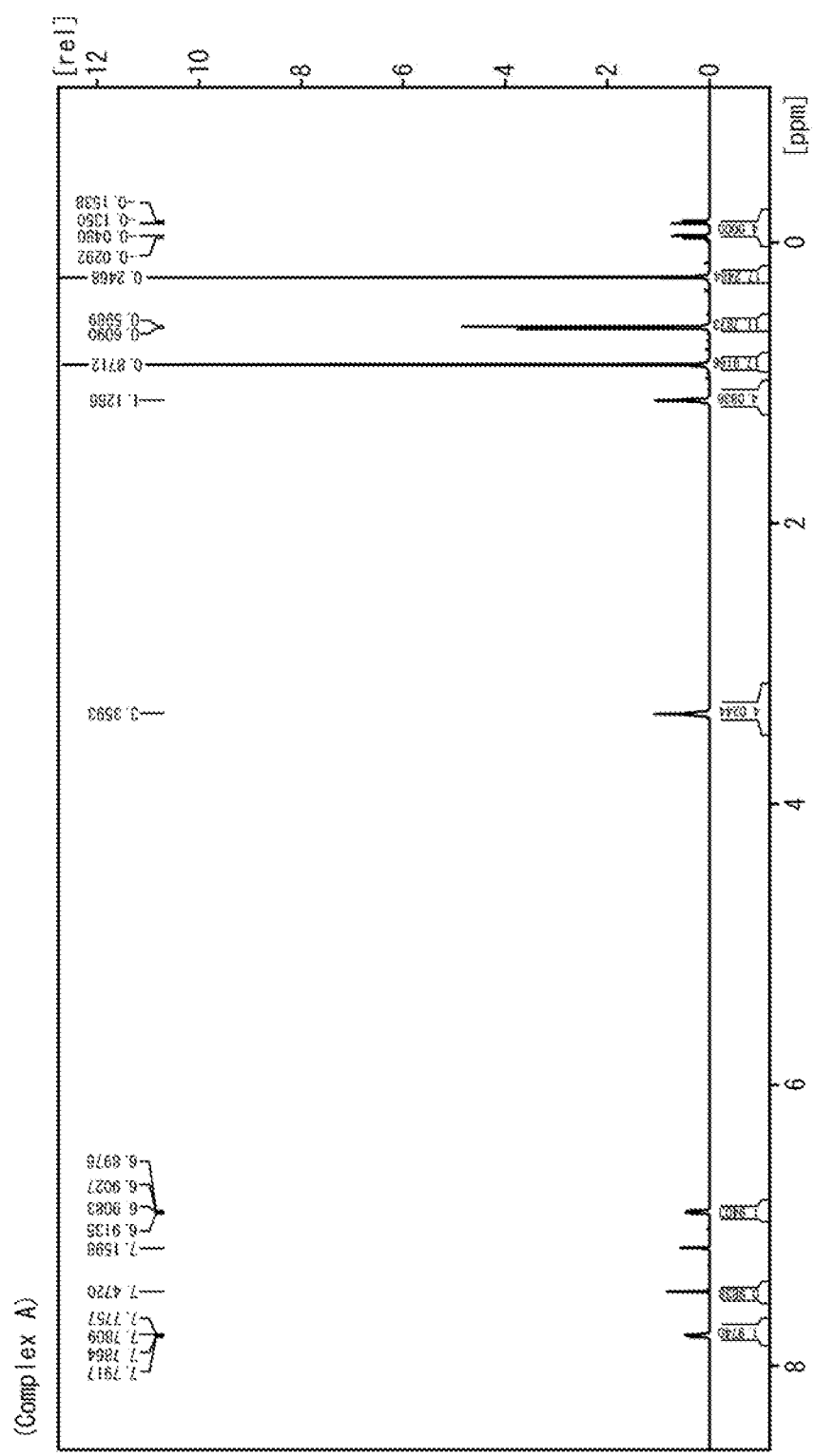
FIG. 1 is a $^1$H-NMR spectrum of the component (A) used in the method of producing a multicomponent copolymer of one embodiment of the present disclosure.

The following describes the present disclosure in detail based on embodiments.

Method of Producing Multicomponent Copolymer

The method of producing a multicomponent copolymer of one embodiment of the present disclosure (hereinafter, it may be referred to as "the production method of the present embodiment") is a method of producing a multicomponent copolymer of using at least ethylene, a non-conjugated olefin compound having 3 to 10 carbon atoms, and a conjugated diene compound as monomers and copolymerizing them.

In the present specification, the "multicomponent copolymer" refers to a copolymer obtained by copolymerizing at least three kinds of monomers. That is, the multicomponent copolymer obtained by copolymerizing ethylene, a non-conjugated olefin compound having 3 to 10 carbon atoms, and a conjugated diene compound means a copolymer obtained by copolymerizing at least ethylene, at least one kind of non-conjugated olefin compound having 3 to 10 carbon atoms, and at least one kind of conjugated diene compound. According to the production method of the present embodiment, a terpolymer, for example, can be suitably produced. This is because terpolymers not only are less likely to cause side reactions during production but also has high industrial demand and versatility.

For the multicomponent copolymer produced with the production method of the present embodiment, it is preferable that the main chain consist only of an acyclic structure. In the present specification, the "main chain" refers to a long chain connecting bonding terminals of respective units in the copolymer. The "main chain" does not include any branched moiety (i.e., pendant group) not bonded to an adjacent unit in respective units in the copolymer. For example, when an aromatic vinyl compound is used as a monomer, the "main chain" of the obtained multicomponent copolymer does not include any aromatic ring in units derived from the aromatic vinyl compound in the multicomponent copolymer. In other words, an aromatic ring in the units derived from the aromatic vinyl compound in the multicomponent copolymer is not included in the main chain of the multicomponent copolymer as long as it is not bonded to an adjacent unit.

In addition, "the main chain consists only of an acyclic structure" means that the main chain does not contain any aliphatic ring structure, aromatic ring structure or heterocyclic structure. In the production method of the present embodiment, in order to produce a multicomponent copolymer having a main chain consisting only of an acyclic structure, the main chain can be formed by subjecting ethylene, a non-conjugated olefin compound having 3 to 10 carbon atoms, and a conjugated diene compound to addition polymerization without a cyclization reaction during the copolymerization. Note that NMR is used as a main measuring means for confirming whether or not the main chain of the copolymer consists only of an acyclic structure. Specifically, when a peak derived from a cyclic structure (for example, a peak appearing at 10 ppm to 24 ppm for a three- to five-membered alicyclic structure) is not observed in the main chain, it means that the main chain of the copolymer consists only of an acyclic structure.

Further, in the multicomponent copolymer produced with the production method of the present embodiment, the main chain may consist only of a straight chain or may have a side chain.

The production method of the present embodiment includes a step (polymerization step) of copolymerizing ethylene, a non-conjugated olefin compound having 3 to 10 carbon atoms, and a conjugated diene compound, in the presence of a polymerization catalyst composition containing a rare earth element compound (component (A)) represented by the following general formula (I):

(where M is a scandium, yttrium or lanthanoid element; Cp is a group selected from the group consisting of a cyclopentadienyl group, an indenyl group, a fluorenyl group, and derivatives thereof; X and X' are a hydrogen atom, a halogen atom, an alkoxide group, a thiolate group, an amide group, a silyl group, or a hydrocarbon group having 1 to 20 carbon atoms, where the hydrocarbon group having 1 to 20 carbon atoms may have a group containing silicon, oxygen, nitrogen, sulfur, or phosphorus at a terminal or between terminals; X and X' may be the same with or different from each other; a and b are each independently an integer from 0 to 3, where $a+b \geq 1$; L is a neutral Lewis base; and c is an integer from 0 to 3). The production method of the present embodiment may appropriately include other steps such as a coupling step or a cleaning step if necessary. Note that the polymerization catalyst composition may further contain, if necessary, an organometallic compound (component (B)), an ionic compound (component (C)), a halogen compound (component (D)), an aluminoxane (component (G)), a solvent, and the like. These components will be described later.

The following describes the monomers used in the production method of the present embodiment.

Non-Conjugated Olefin Compound Having 3 to 10 Carbon Atoms

In the production method of the present embodiment, a non-conjugated olefin compound having 3 to 10 carbon atoms is used as a monomer. The non-conjugated olefin compound having 3 to 10 carbon atoms is not particularly limited, and examples thereof include α-olefins such as propylene, 1-butene, 1-pentene, 1-hexene, 1-heptene, or 1-octene; and heteroatom-substituted alkene compounds such as vinyl pivalate, 1-phenylthioethene, or N-vinylpyrrolidone. The non-conjugated olefin compound is not particularly limited and may be the above-mentioned non-conjugated olefin compounds. Among these, it is preferably an acyclic non-conjugated olefin compound, more preferably an α-olefin, and still more preferably at least one selected from the group consisting of 1-hexene and 1-octene. Because α-olefins such as 1-hexene and 1-octene have a double bond at the α-position of the olefin, they can be efficiently polymerized with ethylene and a conjugated diene compound and can further reduce the crystallinity of the produced multicomponent copolymer to further improve the weather resistance of rubber compositions and rubber products, such as tires, using the multicomponent copolymer. In addition, α-olefins, especially 1-hexene and 1-octene, are readily available and can be used to reduce production costs. The non-conjugated olefin compound may be used alone or in combination of two or more.

Conjugated Diene Compound

In the production method of the present embodiment, a conjugated diene compound is used as a monomer. The conjugated diene compound is not particularly limited, and, for example, it is preferably a conjugated diene compound having 4 to 8 carbon atoms. Specific examples of the conjugated diene compound include 1,3-butadiene, isoprene, 1,3-pentadiene, and 2,3-dimethylbutadiene. Among these, it is preferably at least one selected from the group consisting of 1,3-butadiene and isoprene. Using 1,3-butadiene and/or isoprene as the conjugated diene compound can effectively improve the durability of rubber compositions and rubber products, such as tires, using the produced multicomponent copolymer. In addition, 1,3-butadiene and isoprene are readily available and can be used to reduce production costs. The conjugated diene compound may be used alone or in combination of two or more.

Other Monomers

In the production method of the present embodiment, other monomers than those mentioned above may be used. Examples of the other monomers include aromatic vinyl compounds such as styrene, o-methylstyrene, m-methylstyrene, p-methylstyrene, o,p-dimethylstyrene, o-ethylstyrene, m-ethylstyrene, and p-ethylstyrene. The other monomers may be used alone or in combination of two or more. However, in the production method of the present embodiment, it is preferable not to use other monomers (only ethylene, a non-conjugated olefin compound having 3 to 10 carbon atoms, and a conjugated diene compound are used as monomers).

Next, the components of the polymerization catalyst composition used in the production method of the present embodiment will be described.

(A) Rare Earth Element Compound

The polymerization catalyst composition contains the component (A), that is, a rare earth element compound represented by the following general formula (I):

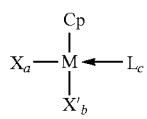

(I)

(where M is a scandium, yttrium or lanthanoid element; Cp is a group selected from the group consisting of a cyclopentadienyl group, an indenyl group, a fluorenyl group, and derivatives thereof; X and X' are a hydrogen atom, a halogen atom, an alkoxide group, a thiolate group, an amide group, a silyl group, or a hydrocarbon group having 1 to 20 carbon atoms, where the hydrocarbon group having 1 to 20 carbon atoms may have a group containing silicon, oxygen, nitrogen, sulfur, or phosphorus at a terminal or between terminals; X and X' may be the same with or different from each other; a and b are each independently an integer from 0 to 3, where $a+b \geq 1$; L is a neutral Lewis base; and c is an integer from 0 to 3). The component (A) may be used alone or in combination of two or more.

The central metal M in the above general formula (I) is a scandium, yttrium or lanthanoid element. The lanthanoid element includes 15 elements with atomic numbers 57 to 71 and may be any of them. Preferred examples of the central metal M include samarium (Sm), neodymium (Nd), praseodymium (Pr), gadolinium (Gd), cerium (Ce), holmium (Ho), scandium (Sc), and yttrium (Y).

The Cp in the above general formula (I) may be a derivative having a cyclopentadienyl ring, an indenyl ring or a fluorenyl ring as a basic skeleton and having any one or more substituents.

A derivative of an indenyl group (a substituted indenyl group) can be represented by $C_9H_{7-A}R_A$ or $C_9H_{11-A}R_A$. As used herein, A is the number of substituents on the substituted indenyl group and is an integer of 1 to 7 or 1 to 11. A is preferably 2 or more and is preferably present on a five-membered ring of a substituted indenyl group. Further, R is a substituent, and each R is preferably independently a hydrocarbyl group or a metalloid group. It is more preferable that the hydrocarbyl group have 1 to 20 carbon atoms, further preferable that the hydrocarbyl group have 1 to 10 carbon atoms, and still more preferable that the hydrocarbyl group have 1 to 8 carbon atoms. Preferred specific examples of the hydrocarbyl group include a methyl group, an ethyl group, a tert-butyl group, a cyclopentanyl group, a phenyl group, and a benzyl group. Among these, it is preferable that at least one R be an aromatic group such as a phenyl group or a benzyl group. When A is 2 or more, or R has a bulky substituent such as an aromatic group, Cp becomes further bulky, and the monomers to be polymerized approach the central metal M of the compound represented by the general formula (I) from the X side or X' side because of steric hindrance. As a result, the vinyl portion of the non-conjugated olefin compound can be easily introduced. On the other hand, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group, a t-butyldimethylsilyl group, and a benzyldimethylsilyl group. Specific examples of the substituted indenyl include 2-phenylindenyl, 2-methylindenyl, 1-methyl-2-phenylindenyl, 1,3-bis(t-butyldimethylsilyl)indenyl, 1-ethyl-2-phenylindenyl, and 1-benzyl-2-phenylindenyl. The substituted indenyl may have phenanthrene.

A derivative of a cyclopentadienyl group (substituted cyclopentadienyl group) may be represented by $C_5H_{5-A}R_A$. As used herein, A is the number of substituents on the substituted cyclopentadienyl group and is an integer of 1 to 4. A is preferably 2 or more. Further, R is a substituent, and each R is preferably independently a hydrocarbyl group or a metalloid group. It is more preferable that the hydrocarbyl group have 1 to 20 carbon atoms, further preferable that the hydrocarbyl group have 1 to 10 carbon atoms, and still more preferable that the hydrocarbyl group have 1 to 8 carbon atoms. Preferred specific examples of the hydrocarbyl group include a methyl group, an ethyl group, a tert-butyl group, a cyclopentanyl group, a phenyl group, and a benzyl group. Among these, it is preferable that at least one R be an aromatic group such as a phenyl group or a benzyl group. When A is 2 or more, or R has a bulky substituent such as an aromatic group, Cp becomes further bulky, and the monomers to be polymerized approach the central metal M of the compound represented by the general formula (I) from the X side or X' side because of steric hindrance. As a result, the vinyl portion of the non-conjugated olefin compound can be easily introduced. On the other hand, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group, a t-butyldimethylsilyl group, and a benzyldimethylsilyl group. Specific examples of the substituted cyclopentadienyl include one represented by the following general formula:

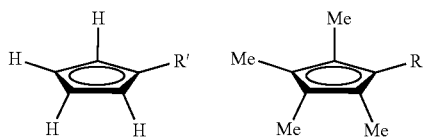

(where R' is a methyl group or an ethyl group, and R is a hydrogen atom, a methyl group or an ethyl group). The substituted cyclopentadienyl may have phenanthrene.

A derivative of a fluorenyl group (substituted fluorenyl group) may be represented by $C_{13}H_{9-A}R_A$ or $C_{13}H_{17-A}R_A$. As used herein, A is the number of substituents on the substituted fluorenyl group and is an integer of 1 to 9 or 1 to 17. A is preferably 2 or more. Further, R is a substituent, and each R is preferably independently a hydrocarbyl group or a metalloid group. It is preferable that the hydrocarbyl group have 1 to 20 carbon atoms, more preferable that the hydrocarbyl group have 1 to 10 carbon atoms, and still more preferable that the hydrocarbyl group have 1 to 8 carbon atoms. Preferred specific examples of the hydrocarbyl group include a methyl group, an ethyl group, a tert-butyl group, a cyclopentanyl group, a phenyl group, and a benzyl group. Among these, it is preferable that at least one R be an aromatic group such as a phenyl group or a benzyl group. When A is 2 or more, or R has a bulky substituent such as an aromatic group, Cp becomes further bulky, and the monomers to be polymerized approach the central metal M of the compound represented by the general formula (I) from the X side or X' side because of steric hindrance. As a result, the vinyl portion of the non-conjugated olefin compound can be easily introduced. On the other hand, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group, a t-butyldimethylsilyl group, and a benzyldimethylsilyl group. The substituted fluorenyl may have phenanthrene.

The X and X' in the above general formula (I) are a hydrogen atom, a halogen atom, an alkoxide group, a thiolate group, an amide group, a silyl group, or a hydrocarbon group having 1 to 20 carbon atoms. Note that X and X' may be the same with or different from each other.

Examples of the halogen atom include a fluorine atom, a chlorine atom, a bromine atom, and an iodine atom. Among these, a chlorine atom or a bromine atom is preferred.

Examples of the alkoxide group include aliphatic alkoxy groups such as a methoxy group, an ethoxy group, a propoxy group, a n-butoxy group, an isobutoxy group, a sec-butoxy group, and a tert-butoxy group; and aryl oxide groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group. Among these, a 2,6-di-tert-butylphenoxy group is preferred.

Examples of the thiolate group include aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group. Among these, a 2,4,6-triisopropylthiophenoxy group is preferred.

Examples of the amide group include aliphatic amide groups such as a dimethylamide group, a diethylamide group, and a diisopropylamide group; aryl amide groups such as a phenylamide group, a 2,6-di-tert-butylphenylamide group, a 2,6-diisopropylphenylamide group, a 2,6-dineopentylphenylamide group, a 2-tert-butyl-6-isopropylphenylamide group, a 2-tert-butyl-6-neopentylphenylamide group, a 2-isopropyl-6-neopentylphenylamide group, and a 2,4,6-tri-tert-butylphenylamide group; and bistrialkylsilyl amide groups such as a bistrimethylsilylamide group. Among these, a bistrimethylsilylamide group is preferred.

Examples of the silyl group include a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group. Among these, a tris(trimethylsilyl)silyl group is preferred.

Specific examples of the hydrocarbon group having 1 to 20 carbon atoms include aliphatic hydrocarbon groups having a linear chain structure or a branched structure such as a methyl group, an ethyl group, a n-propyl group, an isopropyl group, a n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; and aralkyl groups such as a benzyl group. Further, the hydrocarbon group having 1 to 20 carbon atoms may have a group containing silicon, oxygen, nitrogen, sulfur, or phosphorus at a terminal or between terminals.

Examples of the silicon-containing group include a trimethylsilyl group. That is, X and X' may be, for example, a (trimethylsilyl)methyl group, or a (bistrimethylsilyl)methyl group. Among these, a methyl group, an ethyl group, an isobutyl group, and a (trimethylsilyl)methyl group are preferred.

The L in the above general formula (I) is a neutral Lewis base.

Examples of the neutral Lewis base L include tetrahydrofuran (THF), diethyl ether, dimethylaniline, trimethylphosphine, lithium chloride, neutral olefins, and neutral diolefins. When the component (A) includes a plurality of neutral Lewis bases L, the neutral Lewis bases L may be the same with or different from each other.

The component (A) can be prepared as follows, for example. That is, the component (A) can be prepared by synthesizing a rare earth element compound (component (E)) represented by the following general formula (III) and a cyclopentadiene skeleton-containing compound (component (F)) having a group selected from the group consisting of a cyclopentadienyl group, an indenyl group and a fluorenyl group:

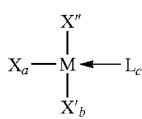

(III)

(where M is a scandium, yttrium or lanthanoid element; X, X', and X" are a hydrogen atom, a halogen atom, an alkoxide group, a thiolate group, an amide group, a silyl group, or a hydrocarbon group having 1 to 20 carbon atoms, where the hydrocarbon group having 1 to 20 carbon atoms may have a group containing silicon, oxygen, nitrogen, sulfur, or phosphorus at a terminal or between terminals; X, X', and X" may be the same with or different from each other; and a and b are each independently an integer from 0 to 3, where a+b≥1). Each of the component (E) and the component (F) may be used alone or in combination of two or more.

Note that specific examples and preferred examples of M, X, X', and L in the formula (III) are the same as those described above for the formula (I), and specific examples and preferred examples of X" are the same as those described above for X and X'.

The cyclopentadiene skeleton-containing compound (component (F)) is at least one compound selected from the group consisting of substituted or unsubstituted cyclopentadiene, substituted or unsubstituted indene, and substituted or unsubstituted fluorene. Particularly, the component (F) is preferably substituted cyclopentadiene, substituted indene, or substituted fluorene, and more preferably substituted indene. This advantageously increases the bulk of the polymerization catalyst, so that the reaction time can be shortened and the reaction temperature can be increased. Further, this provides a large number of conjugated electrons, so that the catalytic activity in the reaction system can be further improved.

Examples of the substituted cyclopentadiene include pentamethylcyclopentadiene, tetramethylcyclopentadiene, isopropylcyclopentadiene, and trimethylsilyl-tetramethylcyclopentadiene.

Examples of the substituted indene include 2-phenyl-1H-indene, 3-benzyl-1H-indene, 3-methyl-2-phenyl-1H-indene, 3-benzyl-2-phenyl-1H-indene, and 1-benzyl-1H-indene. Particularly, 3-benzyl-1H-indene and 1-benzyl-1H-indene are preferred from the viewpoint of reducing molecular weight distribution.

Examples of the substituted fluorene include trimethylsilylfluorene and isopropylfluorene.

(B) Organometallic Compound

The polymerization catalyst composition preferably further contains a component (B), that is, an organometallic compound (component (B)) represented by the following general formula (II):

$$ZR^1_e R^2_f R^3_g \quad (II)$$

(where Z is a metallic element selected from the group consisting of elements of Group 1, Group 2, Group 12, and Group 13 of the periodic table; $R^1$ and $R^2$ are a hydrocarbon group having 1 to 10 carbon atoms, or a hydrogen atom; $R^3$ is a hydrocarbon group having 1 to 10 carbon atoms; $R^1$, $R^2$, and $R^3$ may be the same with or different from each other; when Z is a metallic element of Group 1 of the periodic table, e is 1, and f and g both are 0; when Z is a metallic element of Group 2 or Group 12 of the periodic table, e and f both are 1, and g is 0; and when Z is a metallic element of Group 13 of the periodic table, e, f, and g are all 1). The component (B) controls the molecular weight and functions as a scavenger. When the polymerization catalyst composition contains the component (B), the polymerization activity can be further improved. The component (B) may be used alone or in combination of two or more.

The component (B) is preferably an organic aluminum compound represented by the general formula (II-2):

$$AlR^1 R^2 R^3 \quad (II-2)$$

(where $R^1$ and $R^2$ are a hydrocarbon group having 1 to 10 carbon atoms, or a hydrogen atom; $R^3$ is a hydrocarbon group having 1 to 10 carbon atoms; and $R^1$, $R^2$, and $R^3$ may be the same with or different from each other).

Examples of the organic aluminum compound include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride; ethylaluminum dihydride, n-propylaluminum dihydride, and isobutylaluminum dihydride. Particularly, triethylaluminum, triisobutylaluminum, diethylaluminum hydride, and diisobutylaluminum hydride are preferred, and diisobutylaluminum hydride is more preferred. The organic aluminum compound may be used alone or in combination of two or more.

From the viewpoint of reaction activity, the ratio (molar ratio) of the content of the component (B) to the content of the component (A) in the polymerization catalyst composition (the ratio of the amount of the component (B) to the amount of the component (A) in the polymerization system) is preferably 3 or more, and more preferably 5 or more, and preferably 50 or less, more preferably 40 or less, and further preferably 30 or less.

(C) Ionic Compound

The polymerization catalyst composition preferably further contains an ionic compound (component (C)). When the polymerization catalyst composition contains the component (C), each monomer other than ethylene can be efficiently copolymerized with ethylene. The component (C) may be used alone or in combination of two or more.

Examples of the component (C) include ionic compounds composed of a non-coordinating anion and a cation.

Examples of the non-coordinating anion include tetravalent boron anions such as tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetrakis(pentafluorophenyl)borate, tetra(tolyl)borate, tetra(xylyl)borate, (triphenyl, pentafluorophenyl)borate, [tris(pentafluorophenyl), phenyl]borate, and tridecahydride-7,8-dicarbaundecaborate. Preferred examples thereof include tetrakis(pentafluorophenyl)borate.

Examples of the cation include a carbonium cation, an oxonium cation, an ammonium cation, a phosphonium cation, a cycloheptatrienyl cation, a ferrocenium cation having a transition metal, and a trityl cation.

Specific examples of the carbonium cation include trisubstituted carbonium cations such as a triphenylcarbonium cation and a tri(substituted phenyl)carbonium cation. More specifically, examples of the tri(substituted phenyl)carbonyl cation include a tri(methylphenyl)carbonium cation and a tri(dimethylphenyl)carbonium cation.

Specific examples of the ammonium cation include trialkylammonium cations such as a trimethylammonium cation, a triethylammonium cation, a tripropylammonium cation, and a tributylammonium cation (e.g. a tri(n-butyl)ammonium cation); N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation.

Specific examples of the phosphonium cation include triarylphosphonium cations such as a triphenylphosphonium cation, a tri(methylphenyl)phosphonium cation, and a tri(dimethylphenyl)phosphonium cation.

Therefore, the ionic compound is preferably a compound obtained by combining a non-coordinating anion and a cation each selected from the above-mentioned ones. Preferred specific examples thereof include N,N-dimethylanilinium tetrakis(pentafluorophenyl)borate, triphenylcarbonium tetrakis(pentafluorophenyl)borate, and trityl tetrakis(pentafluorophenyl)borate.

From the viewpoint of reaction activity, the ratio (molar ratio) of the content of the component (C) to the content of the component (A) in the polymerization catalyst composition (the ratio of the amount of the component (C) to the amount of the component (A) in the polymerization system) is preferably 0.1 or more, more preferably 0.5 or more, and further preferably 0.7 or more, and preferably 2.0 or less, more preferably 1.5 or less, and further preferably 1.3 or less.

(D) Halogen Compound

The polymerization catalyst composition may further contain a halogen compound (component (D)). When the polymerization catalyst composition contains the component (D), it is possible to further increase the cis-1,4 bond content in the units derived from the conjugated diene compound. Examples of the halogen compound include a halogen-containing compound that is a Lewis acid (hereinafter also referred to as "component (D-1)"), a complex compound of a metal halide and a Lewis base (hereinafter also referred to as "component (D-2)"), and an organic compound containing active halogen (hereinafter also referred to as "component (D-3)"). The component (D) may be used alone or in combination of two or more.

Examples of the component (D-1) include halogen-containing compounds containing elements of Group 3, Group 4, Group 5, Group 6, Group 8, Group 13, Group 14, or Group 15 of the periodic table. Particularly, an aluminum halide or an organometallic halide is preferred.

Examples of the halogen-containing compound that is a Lewis acid include titanium tetrachloride, tungsten hexachloride, tri(pentafluorophenyl)borate, methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, aluminum tribromide, tri(pentafluorophenyl)aluminum, dibutyltin dichloride, tin tetrachloride, phosphorus trichloride, phosphorus pentachloride, antimony trichloride, and antimony pentachloride. Particularly, ethylaluminum dichloride, ethylaluminum dibromide, diethylaluminum chloride, diethylaluminum bromide, ethylaluminum sesquichloride, and ethylaluminum sesquibromide are preferred.

The halogen is preferably chlorine or bromine.

The halogen-containing compound that is a Lewis acid (component (D-1)) may be used alone or in combination of two or more.

Examples of the metal halide used in the component (D-2) include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, and gold bromide. Particularly, magnesium chloride, calcium chloride, barium chloride, zinc chloride, manganese chloride, and copper chloride are preferred, and magnesium chloride, zinc chloride, manganese chloride, and copper chloride are further preferred.

The Lewis base used in the component (D-2) is preferably a phosphorus compound, a carbonyl compound, a nitrogen compound, an ether compound, or an alcohol. Examples thereof include tributyl phosphate, tri-2-ethylhexyl phosphate, triphenyl phosphate, tricresyl phosphate, triethylphosphine, tributylphosphine, triphenylphosphine, diethylphosphino ethane, diphenylphosphino ethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, and lauryl alcohol. Particularly, tri-2-ethylhexyl phosphate, tricresyl phosphate, acetylacetone, 2-ethylhexanoic acid, versatic acid, 2-ethylhexyl alcohol, 1-decanol, and lauryl alcohol are preferred.

In the reaction, the number of moles of the Lewis base is at a ratio of 0.01 moles to 30 moles and preferably 0.5 moles to 10 moles with respect to 1 mole of the metal halide. Using the reaction product of the Lewis base can reduce the amount of metal remaining in the copolymer.

The complex compound of a metal halide and a Lewis base (component (D-2)) may be used alone or in combination of two or more.

Examples of the component (D-3) include benzyl chloride.

The organic compound containing active halogen (component (D-3)) may be used alone or in combination of two or more.

(G) Aluminoxane

The polymerization catalyst composition may further contain an aluminoxane (component (G)). The aluminoxane is a compound obtained by contacting an organic aluminum compound with a condensation agent. Examples thereof include a chain aluminoxane or a cyclic aluminoxane having a repeating unit represented by the general formula (—Al(R')O—) (where R' is a hydrocarbon group having 1 to 10 carbon atoms, some of the hydrocarbon groups may be substituted with a halogen atom and/or an alkoxy group, and the degree of polymerization of the repeating unit is preferably 5 or more and more preferably 10 or more). Here, specific examples of R' include a methyl group, an ethyl group, a propyl group, and an isobutyl group. Among these, a methyl group is preferred. In addition, examples of the organic aluminum compound used as a raw material of the aluminoxane include trialkylaluminum such as trimethylaluminum, triethylaluminum and triisobutylaluminum, and mixtures thereof. Among these, trimethylaluminum is particularly preferred. Further, the aluminoxane may suitably be an aluminoxane using a mixture of trimethylaluminum and tributylaluminum as a raw material, for example.

With respect to the content of the aluminoxane in the polymerization catalyst composition, it is preferable that the element ratio Al/M of the element M constituting the component (A) and the aluminum element Al constituting the aluminoxane be about 10 to 1000.

Solvent

The polymerization catalyst composition may contain a solvent. The solvent is not particularly limited as long as it is inert in the polymerization reaction, and examples thereof include an aromatic hydrocarbon solvent, an aliphatic hydrocarbon solvent, and an alicyclic hydrocarbon solvent. Examples of the aromatic hydrocarbon solvent include toluene, examples of the aliphatic hydrocarbon solvent include hexane, and examples of the alicyclic hydrocarbon solvent include cyclohexane. The solvent may be used alone or in combination of two or more. Among these, it is preferable to use toluene as the solvent.

Polymerization Step

In the polymerization step of the production method of the present embodiment, monomers including ethylene, a non-conjugated olefin compound having 3 to 10 carbon atoms, and a conjugated diene compound are copolymerized in the presence of the above-mentioned polymerization catalyst composition. In the polymerization step, any polymerization method such as solution polymerization, suspension polymerization, liquid phase bulk polymerization, emulsion polymerization, gas phase polymerization, or solid phase polymerization may be used. The polymerization step may be performed at one stage or multiple stages of two or more stages. A one-stage polymerization step refers to a step of simultaneously reacting to polymerize all kinds of monomers to be copolymerized. A multi-stage polymerization step refers to a step of first reacting some or all of one or two kinds of monomers to form a polymer (first polymerization stage), and then performing one or more stages of polymerization of adding the remaining kinds of monomers and the reminder of the one or two kinds of monomers to polymerize the monomers (second polymerization stage to final polymerization stage).

In the presence of the polymerization catalyst composition, it is possible to control the microstructure in the produced multicomponent copolymer by controlling the charging order of each monomer, the charging amount of each monomer, and other reaction conditions.

In the production method of the present disclosure, the polymerization step is preferably performed in an atmosphere of an inert gas, preferably nitrogen gas or argon gas. The polymerization temperature of the polymerization step is not particularly limited. However, it is preferably in a range of, for example, −100° C. to 200° C., and it may be about room temperature. The polymerization step is preferably performed under pressure in a range of 0.1 MPa to 10.0 MPa so as to allow the non-conjugated olefin compound to be sufficiently introduced into the polymerization reaction system. The reaction time of the polymerization step is not particularly limited and may be in a range of, for example, 1 second to 10 days, which may be selected as appropriate depending on the conditions such as the microstructure desired for the resulting multicomponent copolymer; the type, charging amount, and addition order of each monomer; the type of components of the polymerization catalyst composition; and the polymerization temperature. Further, in the polymerization step, a terminator such as methanol, ethanol, and isopropanol may be used to stop the reaction.

Because ethylene, which is one of the monomers, is a gas at room temperature and normal pressure, it can usually be introduced into the polymerization system by pressing it at an arbitrary pressure. The pressure for pressing the ethylene is not particularly limited. However, from an industrial viewpoint, it is preferably 0.05 MPa or more and more preferably 0.1 MPa or more, and preferably 2.5 MPa or less and more preferably 2.0 MPa or less.

From the viewpoint of obtaining a desired non-conjugated olefin content in the copolymer, the ratio (molar ratio) of the charging amount of the non-conjugated olefin compound to the amount of the component (A) in the polymerization system is preferably 1,000 or more, more preferably 3,000 or more, and further preferably 5,000 or more, and preferably 100,000 or less, more preferably 70,000 or less, and further preferably 50,000 or less.

From the viewpoint of obtaining a desired non-conjugated olefin content in the copolymer, the ratio (molar ratio) of the charging amount of the conjugated diene compound to the amount of the component (A) in the polymerization system is preferably 100 or more, more preferably 300 or more, and further preferably 500 or more, and preferably 70,000 or less, more preferably 60,000 or less, and further preferably 50,000 or less.

The component (A) may be previously prepared and contained in the polymerization catalyst composition or may be synthesized in the polymerization system in which the copolymerization is performed during the polymerization step. That is, in one embodiment, it is possible to previously blend the materials for preparing the component (A) in a polymerization catalyst composition, and synthesize the component (A) in the polymerization catalyst composition when all the monomers are copolymerized in the presence of the polymerization catalyst composition. More specifically, it is possible to previously blend the component (E) described above, which is a rare earth element compound represented by the following general formula (III), and the component (F) described above, which is a cyclopentadiene skeleton-containing compound having a group selected from the group consisting of a cyclopentadienyl group, an indenyl group, and a fluorenyl group, in a polymerization catalyst composition, and synthesize the component (A) from the component (E) and the component (F) in the polymerization catalyst composition when all the monomers are copolymerized in the presence of the polymerization catalyst composition:

(III)

(where M is a scandium, yttrium or lanthanoid element; X, X', and X" are a hydrogen atom, a halogen atom, an alkoxide group, a thiolate group, an amide group, a silyl group, or a hydrocarbon group having 1 to 20 carbon atoms, where the hydrocarbon group having 1 to 20 carbon atoms may have a group containing silicon, oxygen, nitrogen, sulfur, or phosphorus at a terminal or between terminals; X, X', and X" may be the same with or different from each other; and a and b are each independently an integer from 0 to 3, where a+b≥1). By synthesizing the component (A) in the polymerization system in which the copolymerization is performed, it is possible to save the labor required for preparing the catalyst composition in advance.

Coupling Step

The coupling step is a step of performing a reaction (coupling reaction) to modify at least part (for example, a terminal) of a polymer chain of the copolymer obtained in the polymerization step. The coupling reaction can increase the number-average molecular weight (Mn). The coupling reaction is preferably performed when the polymerization reaction is fully completed.

The coupling agent used in the coupling reaction is not particularly limited and may be selected as appropriate depending on the purpose. Examples thereof include tin-containing compounds such as bis(maleic acid-1-octadecyl)dioctyltin; isocyanate compounds such as 4,4'-diphenylmethane diisocyanate; and alkoxysilane compounds such as glycidylpropyltrimethoxysilane. The coupling agent may be used alone or in combination of two or more. Among these, bis(maleic acid-1-octadecyl)dioctyltin is preferred in terms of reaction efficiency and low gel formation.

Cleaning Step

The cleaning step is a step of cleaning the copolymer after the polymerization step or the coupling step. The cleaning step can suitably reduce catalyst residue in the copolymer. The medium used in the cleaning is not particularly limited and may be selected as appropriate depending on the purpose. Examples of the medium include methanol, ethanol, and isopropanol. When a compound derived from a Lewis acid is used as a polymerization catalyst, it is possible to add an acid (for example, hydrochloric acid, sulfuric acid, nitric acid) to these solvents before use. The amount of acid added is preferably 15 mol % or less with respect to the solvent. When it is more than 15 mol %, the acid remains in the copolymer, which may adversely affect reactions in subsequent kneading and vulcanization processes.

EXAMPLES

The following describes the present disclosure in more detail with reference to Examples. However, the present disclosure is not limited to the following Examples.

Synthesized copolymers were measured and evaluated according to the following procedure.

Synthesis of Complex A

In a glovebox under a nitrogen atmosphere, a toluene solution (10 ml) of [1,3-(tBuMe$_2$Si)$_2$C$_9$H$_6$] (0.152 g, 0.441 mmol), which was used as the component (F), was dropped in a toluene solution (10 ml) of [Sc(CH$_2$SiMe$_3$)$_3$(THF)] (0.260 g, 0.577 mmol), which was used as the component (E), at room temperature over 10 minutes and stirred for 2 hours to obtain a solution. The solution was then dried under reduced pressure. A toluene solution (20 ml) was added to the residue after drying, and the mixture was stirred under reduced pressure to remove low-boiling point substances (THF, toluene, Me$_4$Si). Then, this procedure was repeated until complete conversion of [1,3-(tBuMe$_2$Si)$_2$C$_9$H$_6$] and [Sc(CH$_2$SiMe$_3$)$_3$(THF)] by $^1$H-NMR measurement was observed, and a crude product was obtained. Toluene was added to the obtained crude product, and insoluble materials were filtered off. Next, the filtrate was concentrated, and the concentrate was cooled to −30° C. to isolate a complex A, which was a colorless crystal, specifically a 1,3-bis(t-butyldimethylsilyl)indenyl[bis(trimethylsilyl)methyl] scandium complex [1,3-(tBuMe$_2$Si)$_2$C$_9$H$_5$]Sc(CH$_2$SiMe$_3$)$_2$(THF) (yield: 0.200 g, 71.4%), as the component (A).

The $^1$H-NMR spectrum of the complex A is illustrated in FIG. 1 for reference.

$^1$H-NMR(C$_6$D$_6$, δ/ppm): 7.79 (d, 2H, aromatic), 7.47 (s, 1H, aromatic), 6.90 (d, 2H, aromatic), 3.36 (br, 4H, THF), 1.13 (br, 4H, THF), 0.87 (s, 18H, tBuSix2), 0.60 (d, 12H, Me$_2$Six2), 0.25 (d, 12H, Me$_3$Six3), −0.091 (dd, 4H, CH$_2$x2)

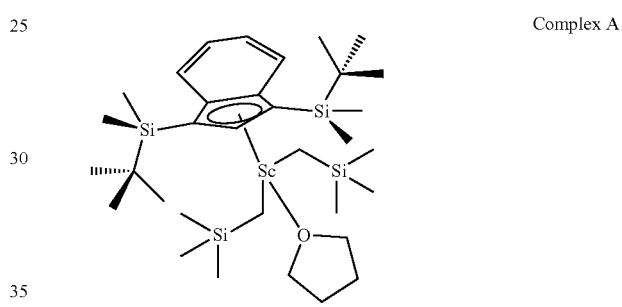

Complex A

Synthesis of Complex B

The synthesis of complex B was performed in the same procedure as in the synthesis of the complex A except that [(1-C$_6$H$_5$CH$_2$Me$_2$Si-3-C$_5$H$_9$)C$_9$H$_6$] (0.147 g, 0.442 mmol) was used as the component (F). A complex B, which was an orange oily residue, specifically a (1-benzyldimethylsilyl-3-cyclopentane)indenyl[bis(trimethylsilyl)methyl] scandium complex [(1-C$_6$H$_5$CH$_2$Me$_2$Si-3-C$_5$H$_9$)C$_9$H$_5$]Sc[(CH$_2$SiMe$_3$)$_2$](THF)(yield: 0.243 g, 88%) was isolated as the component (A).

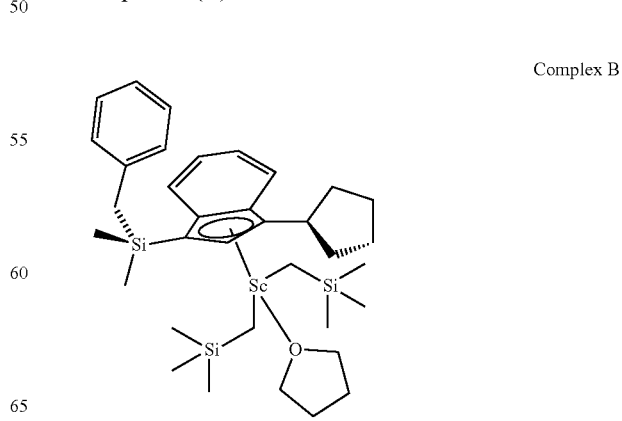

Complex B

Synthesis of Complex C

The synthesis of complex C was performed in the same procedure as in the synthesis of the complex A except that [(1-C$_6$H$_5$CH$_2$-3-tBuMe$_2$Si)C$_9$H$_6$](0.142 g, 0.443 mmol) was used as the component (F). A complex C, which was orange and was a dark orange oily residue (almost quantitative), specifically a (1-benzyl-3-t-butyldimethylsilyl)indenyl[bis(trimethylsilyl)methyl] scandium complex [(1-C$_6$H$_5$CH$_2$-3-tBuMe$_2$Si)C$_9$H$_5$]Sc[(CH$_2$SiMe$_3$)$_2$](THF) (yield: 0.264 g, 89%) was isolated as the component (A).

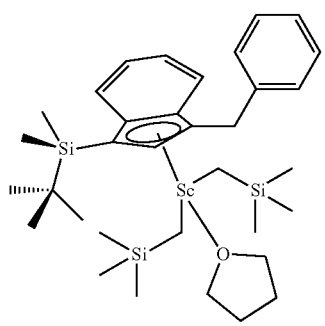

Complex C

Synthesis of Complex D

The synthesis of complex D was performed in the same procedure as in the synthesis of the complex A except that [1-(C$_6$H$_5$CH$_2$Me$_2$Si)C$_{17}$H$_{11}$] (0.162 g, 0.443 mmol) was used as the component (F). A complex D, which was orange and was a dark orange oily residue (almost quantitative), specifically a (1-benzyldimethylsilyl)cyclopenta[1]phenanthrene[bis(trimethylsilyl)methyl] scandium complex [1-(C$_6$H$_5$CH$_2$Me$_2$Si)C$_{17}$H$_{10}$]Sc[(CH$_2$SiMe$_3$)$_2$](THF) (yield: 0.264 g, 91%) was isolated as the component (A).

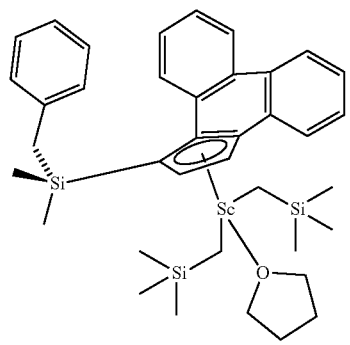

Complex D

Synthesis of Copolymer A

A 2000 mL pressure-resistant stainless-steel reactor was sufficiently dried, and 50.0 g (0.59 mol) of 1-hexene as a non-conjugated olefin compound and 250 g of toluene were added to the reactor. On the other hand, a catalyst D (19.7 mg, 0.03 mmol) as the component (A), trityl tetrakis(pentafluorophenyl)borate [Ph$_3$CB(C$_6$F$_5$)$_4$] (27.6 mg, 0.03 mmol) as the component (C), and 0.50 mmol of triisobutylaluminum as the component (B) were charged in a glovebox under a nitrogen atmosphere, and 20 mL of toluene was added to obtain a catalyst solution.

The obtained catalyst solution was added to the pressure-resistant stainless-steel reactor and heated to 40° C. Next, 80 g of a monomer solution containing 20 g (0.29 mol) of isoprene as a conjugated diene compound was introduced into the pressure-resistant stainless-steel reactor, and copolymerization was performed under ethylene pressure (0.22 MPa) for 110 minutes.

After the copolymerization, 1 mL of an isopropanol solution containing 5 mass % of 2,2'-methylene-bis(4-ethyl-6-t-butylphenol) (NS-5) was added to the pressure-resistant stainless-steel reactor to stop the reaction, and a large amount of methanol was further used to separate a copolymer. The copolymer was vacuum dried at 50° C. to obtain a copolymer A. The yield of the obtained copolymer A was 70 g.

Synthesis of Copolymer B

A 2000 mL pressure-resistant stainless-steel reactor was sufficiently dried, and 50.0 g (0.59 mol) of 1-hexene as a non-conjugated olefin compound and 250 g of toluene were added to the reactor. On the other hand, a catalyst B (18.7 mg, 0.03 mmol) as the component (A), trityl tetrakis(pentafluorophenyl)borate [Ph$_3$CB(C$_6$F$_5$)$_4$] (27.6 mg, 0.03 mmol) as the component (C), and 0.35 mmol of triisobutylaluminum as the component (B) were charged in a glovebox under a nitrogen atmosphere, and 20 mL of toluene was added to obtain a catalyst solution.

The obtained catalyst solution was added to the pressure-resistant stainless-steel reactor and heated to 40° C. Next, 69 g of a monomer solution containing 17 g (0.249 mol) of isoprene as a conjugated diene compound was introduced into the pressure-resistant stainless-steel reactor, and copolymerization was performed under ethylene pressure (0.22 MPa) for 155 minutes.

After the copolymerization, 1 mL of an isopropanol solution containing 5 mass % of 2,2'-methylene-bis(4-ethyl-6-t-butylphenol) (NS-5) was added to the pressure-resistant stainless-steel reactor to stop the reaction, and a large amount of methanol was further used to separate a copolymer. The copolymer was vacuum dried at 50° C. to obtain a copolymer B. The yield of the obtained copolymer B was 63 g.

Synthesis of Copolymer C

A 2000 mL pressure-resistant stainless-steel reactor was sufficiently dried, and 50.0 g (0.59 mol) of 1-hexene as a non-conjugated olefin compound and 250 g of toluene were added to the reactor. On the other hand, a catalyst A (18.7 mg, 0.03 mmol) as the component (A), trityl tetrakis(pentafluorophenyl)borate [Ph$_3$CB(C$_6$F$_5$)$_4$] (27.6 mg, 0.03 mmol) as the component (C), and 0.50 mmol of triisobutylaluminum as the component (B) were charged in a glovebox under a nitrogen atmosphere, and 20 mL of toluene was added to obtain a catalyst solution.

The obtained catalyst solution was added to the pressure-resistant stainless-steel reactor and heated to 40° C. Next, 69 g of a monomer solution containing 17 g (0.249 mol) of isoprene as a conjugated diene compound was introduced into the pressure-resistant stainless-steel reactor, and copolymerization was performed under ethylene pressure (0.15 MPa) for 60 minutes.

After the copolymerization, 1 mL of an isopropanol solution containing 5 mass % of 2,2'-methylene-bis(4-ethyl- 6-t-butylphenol) (NS-5) was added to the pressure-resistant stainless-steel reactor to stop the reaction, and a large amount of methanol was further used to separate a copolymer. The copolymer was vacuum dried at 50° C. to obtain a copolymer C. The yield of the obtained copolymer C was 50 g.

Synthesis of copolymer D

A 2000 mL pressure-resistant stainless-steel reactor was sufficiently dried, and 50.0 g (0.59 mol) of 1-hexene as a non-conjugated olefin compound and 250 g of toluene were added to the reactor. On the other hand, a catalyst C (18.3 mg, 0.03 mmol) as the component (A), trityl tetrakis(pentafluorophenyl)borate $[Ph_3CB(C_6F_5)_4]$ (27.6 mg, 0.03 mmol) as the component (C), and 0.50 mmol of triisobutylaluminum as the component (B) were charged in a glovebox under a nitrogen atmosphere, and 20 mL of toluene was added to obtain a catalyst solution.

The obtained catalyst solution was added to the pressure-resistant stainless-steel reactor and heated to 40° C. Next, 69 g of a monomer solution containing 28 g (0.41 mol) of isoprene as a conjugated diene compound was introduced into the pressure-resistant stainless-steel reactor, and copolymerization was performed under ethylene pressure (0.15 MPa) for 110 minutes.

After the copolymerization, 1 mL of an isopropanol solution containing 5 mass % of 2,2'-methylene-bis(4-ethyl-6-t-butylphenol) (NS-5) was added to the pressure-resistant stainless-steel reactor to stop the reaction, and a large amount of methanol was further used to separate a copolymer. The copolymer was vacuum dried at 50° C. to obtain a copolymer D. The yield of the obtained copolymer D was 48 g.

Synthesis of Copolymer E

A 2000 mL pressure-resistant stainless-steel reactor was sufficiently dried, and 33 g (0.39 mol) of 1-hexene as a non-conjugated olefin compound and 270 g of toluene were added to the reactor. On the other hand, a catalyst C (18.3 mg, 0.03 mmol) as the component (A), trityl tetrakis(pentafluorophenyl)borate $[Ph_3CB(C_6F_5)_4]$ (27.6 mg, 0.03 mmol) as the component (C), and 0.50 mmol of triisobutylaluminum as the component (B) were charged in a glovebox under a nitrogen atmosphere, and 20 mL of toluene was added to obtain a catalyst solution.

The obtained catalyst solution was added to the pressure-resistant stainless-steel reactor and heated to 40° C. Next, 60 g of a monomer solution containing 15 g (0.22 mol) of isoprene as a conjugated diene compound was introduced into the pressure-resistant stainless-steel reactor, and copolymerization was performed under ethylene pressure (0.15 MPa) for 60 minutes.

After the copolymerization, 1 mL of an isopropanol solution containing 5 mass % of 2,2'-methylene-bis(4-ethyl-6-t-butylphenol) (NS-5) was added to the pressure-resistant stainless-steel reactor to stop the reaction, and a large amount of methanol was further used to separate a copolymer. The copolymer was vacuum dried at 50° C. to obtain a copolymer E. The yield of the obtained copolymer E was 40 g.

Synthesis of Copolymer F

A 2000 mL pressure-resistant stainless-steel reactor was sufficiently dried, and 40 g (0.36 mol) of 1-octene as a non-conjugated olefin compound and 340 g of toluene were added to the reactor. On the other hand, a catalyst C (18.3 mg, 0.03 mmol) as the component (A), trityl tetrakis(pentafluorophenyl)borate $[Ph_3CB(C_6F_5)_4]$ (27.6 mg, 0.03 mmol) as the component (C), and 0.50 mmol of triisobutylaluminum as the component (B) were charged in a glovebox under a nitrogen atmosphere, and 20 mL of toluene was added to obtain a catalyst solution.

The obtained catalyst solution was added to the pressure-resistant stainless-steel reactor and heated to 40° C. Next, 78 g of a monomer solution containing 20 g (0.29 mol) of isoprene as a conjugated diene compound was introduced into the pressure-resistant stainless-steel reactor, and copolymerization was performed under ethylene pressure (0.15 MPa) for 120 minutes.

After the copolymerization, 1 mL of an isopropanol solution containing 5 mass % of 2,2'-methylene-bis(4-ethyl-6-t-butylphenol) (NS-5) was added to the pressure-resistant stainless-steel reactor to stop the reaction, and a large amount of methanol was further used to separate a copolymer. The copolymer was vacuum dried at 50° C. to obtain a copolymer F. The yield of the obtained copolymer F was 65 g.

Synthesis of Copolymer G

A 2000 mL pressure-resistant stainless-steel reactor was sufficiently dried, and 40 g (0.36 mol) of 1-octene as a non-conjugated olefin compound and 340 g of toluene were added to the reactor. On the other hand, a catalyst C (18.3 mg, 0.03 mmol) as the component (A), trityl tetrakis(pentafluorophenyl)borate $[Ph_3CB(C_6F_5)_4]$ (27.6 mg, 0.03 mmol) as the component (C), and 0.50 mmol of triisobutylaluminum as the component (B) were charged in a glovebox under a nitrogen atmosphere, and 20 mL of toluene was added to obtain a catalyst solution.

The obtained catalyst solution was added to the pressure-resistant stainless-steel reactor and heated to 40° C. Next, 224 g of a monomer solution containing 56 g (0.82 mol) of isoprene as a conjugated diene compound was introduced into the pressure-resistant stainless-steel reactor, and copolymerization was performed under ethylene pressure (0.30 MPa) for 120 minutes.

After the copolymerization, 1 mL of an isopropanol solution containing 5 mass % of 2,2'-methylene-bis(4-ethyl-6-t-butylphenol) (NS-5) was added to the pressure-resistant stainless-steel reactor to stop the reaction, and a large amount of methanol was further used to separate a copolymer. The copolymer was vacuum dried at 50° C. to obtain a copolymer G. The yield of the obtained copolymer G was 70 g.

Synthesis of Copolymer H

A 2000 mL pressure-resistant stainless-steel reactor was sufficiently dried, and 300 g of toluene was added to the reactor to dissolve 60 g (1.43 mol) of propylene as a non-conjugated olefin compound. On the other hand, a catalyst D (33.0 mg, 0.05 mmol) as the component (A), trityl tetrakis(pentafluorophenyl)borate $[Ph_3CB(C_6F_5)_4]$ (51.0 mg, 0.055 mmol) as the component (C), and 1.0 mmol of diisobutylaluminum hydride as the component (B) were charged in a glovebox under a nitrogen atmosphere, and 20 mL of toluene was added to obtain a catalyst solution.

The obtained catalyst solution was added to the pressure-resistant stainless-steel reactor and heated to 40° C. Next, 21 g of a monomer solution containing 5.3 g (0.08 mol) of isoprene as a conjugated diene compound was introduced into the pressure-resistant stainless-steel reactor, and copolymerization was performed under ethylene pressure (0.22 MPa) for 40 minutes.

After the copolymerization, 1 mL of an isopropanol solution containing 5 mass % of 2,2'-methylene-bis(4-ethyl-6-t-butylphenol) (NS-5) was added to the pressure-resistant stainless-steel reactor to stop the reaction, and a large amount of methanol was further used to separate a copolymer. The copolymer was vacuum dried at 50° C. to obtain a copolymer H. The yield of the obtained copolymer H was 38 g.

Confirmation of Main Chain Structure of Synthesized Copolymer

The synthesized copolymers were each subjected to $^{13}$C-NMR spectrum measurement. The measurement used hexachlorobutadiene as a solvent. No peak (10 ppm to 24 ppm) derived from carbon forming a three- to five-membered alicyclic structure was observed in the $^{13}$C-NMR spectrum of any of the copolymers. In this way, it was confirmed that the main chain of the synthesized copolymer consisted only of an acyclic structure.

Microstructure

The percentages of ethylene unit, non-conjugated olefin unit and conjugated diene unit (isoprene unit) in each synthesized copolymer, and the 1,4 bond content and the 3,4-vinyl bond content in the conjugated diene unit were determined from the percentage of the integrated value of each peak in the $^1$H-NMR spectrum (100° C., d-tetrachloroethane standard: 6 ppm). Specifically, the following peak integration values of $I_1$ to $I_4$ were determined from the $^1$H-NMR spectrum, and the percentages and the contents were determined according to the following expressions for each kind of non-conjugated olefin compound (propylene, 1-hexene, 1-octene) used. Then, for the percentages of the ethylene unit, the non-conjugated olefin unit and the conjugated diene unit, the obtained molar ratio value was converted into a mass ratio. Further, for the 3,4-vinyl bond content, the mass ratio in the copolymer was also determined. The results are listed in Table 1. Note that the 1,2-vinyl bond content of each of the synthesized copolymers was 0%.

Figure 2:
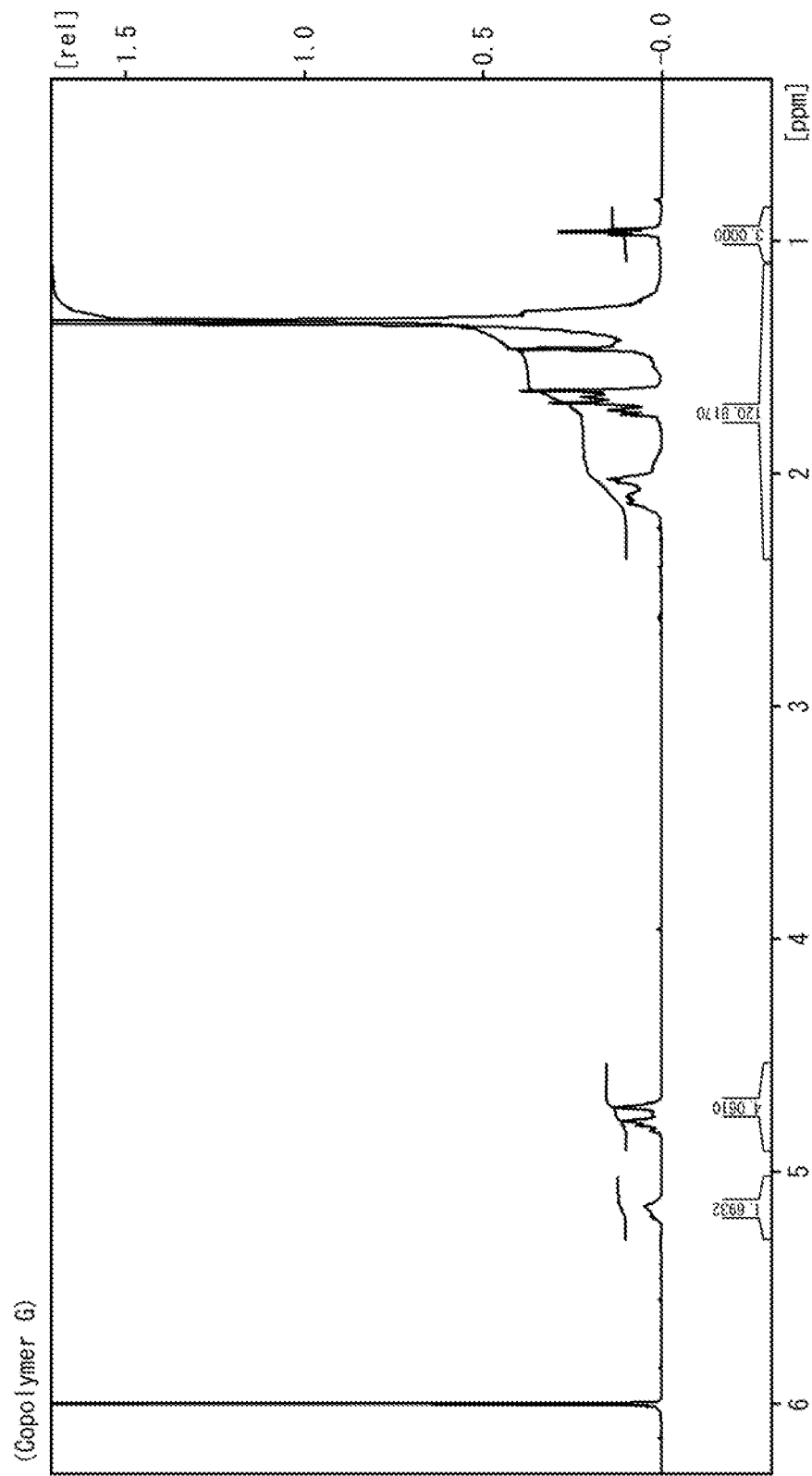
FIG. 2 is a $^1$H-NMR spectrum of a multicomponent copolymer produced with the method of producing a multicomponent copolymer of one embodiment of the present disclosure.

The $^1$H-NMR spectrum of the copolymer G is illustrated in FIG. 2 for reference.

$I_1$: from the peak integrated value of 4.90 ppm to 5.20 ppm (1,4-bond)
$I_2$: from the peak integrated value of 4.50 ppm to 4.90 ppm (3,4-vinyl bond)
$I_3$: from the peak integrated value of 0.80 ppm to 2.40 ppm
$I_4$: from the peak integrated value of 0.80 ppm to 1.1 ppm (olefin methyl)

System Using Propylene as Non-Conjugated Olefin Compound percentage of isoprene unit (Ip) [mol %]=$(12I_1+6I_2)/(3I_3-9I_1-3I_2-2I_4)\times 100$
1,4 bond content [mol %]=$2I_1/(2I_1+I_2)$
3,4-vinyl bond content [mol %]=100−(1,4 bond content)
percentage of propylene unit (Pp) [mol %]=$4I_4/(3I_3-9I_1-3I_2-2I_4)\times 100$
percentage of ethylene unit (Et) [mol %]=100−(Ip)−(Pp)

System Using 1-Hexene as Non-Conjugated Olefin Compound percentage of isoprene unit (Ip) [mol %]=$(12I_1+6I_2)/(3I_3-9I_1-3I_2-8I_4)\times 100$
1,4 bond content [mol %]=$2I_1/(2I_1+I_2)$
3,4-vinyl bond content [mol %]=100−(1,4 bond content)
percentage of 1-hexene unit (Hx) [mol %]=$4I_4/(3I_3-9I_1-3I_2-8I_4)\times 100$
percentage of ethylene unit (Et) [mol %]=100−(Ip)−(Hx)

System Using 1-Octene as Non-Conjugated Olefin Compound percentage of isoprene unit (Ip) [mol %]=$(12I_1+6I_2)/(3I_3-9I_1-3I_2-12I_4)\times 100$
1,4 bond content [mol %]=$2I_1/(2I_1+I_2)$
3,4-vinyl bond content [mol %]=100−(1,4 bond content)
percentage of 1-octene unit (Oc) [mol %]=$4I_4/(3I_3-9I_1-3I_2-12I_4)\times 100$
percentage of ethylene unit (Et) [mol %]=100−(Ip)−(Oc)

Number-Average Molecular Weight, Weight-Average Molecular Weight, and Molecular Weight Distribution The polystyrene-equivalent number-average molecular weight (Mn) and weight-average molecular weight (Mw) and the molecular weight distribution (Mw/Mn) of each synthesized copolymer were determined by gel permeation chromatography [GPC: HLC-8220GPC/HT manufactured by Tosoh Corporation, column: two of GMH$_{HR}$-H(S)HT manufactured by Tosoh Corporation), detector: a differential refractometer (RI)] based on monodispersed polystyrene. The measurement temperature was 40° C. The results are listed in Table 1.

Melting Point and Degree of Crystallinity

The DSC spectrum of each synthesized copolymer was determined using a differential scanning calorimeter (DSC, "DSCQ2000" manufactured by TA Instruments Japan Inc.), and the melting point (Tm) of each copolymer was measured according to JIS K 7121-1987.

In addition, the degree of crystallinity of each copolymer was measured. Specifically, the crystal melting energy of polyethylene consisting of 100% of crystal components and the melting peak energy of each copolymer were measured by DSC, and the degree of crystallinity was calculated from the energy ratio between polyethylene and each copolymer.

Figure 3:
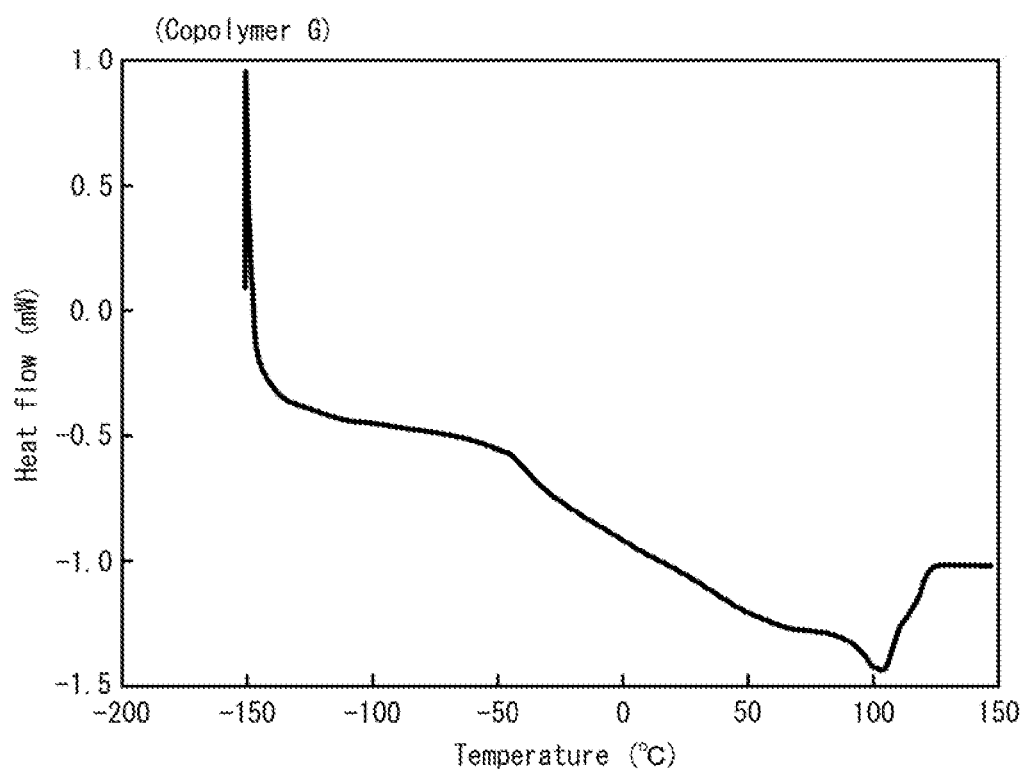
FIG. 3 is a DSC spectrum of a multicomponent copolymer produced with the method of producing a multicomponent copolymer of one embodiment of the present disclosure.

The results are listed in Table 1. The DSC spectrum of the copolymer G is illustrated in FIG. 3 for reference.

TABLE 1

| | Copolymer A | Copolymer B | Copolymer C | Copolymer D | Copolymer E | Copolymer F | Copolymer G | Copolymer H |
|---|---|---|---|---|---|---|---|---|
| Non-conjugated olefin compound | 1-hexene | 1-hexene | 1-hexene | 1-hexene | 1-hexene | 1-octene | 1-octene | propylene |
| Rare earth element compound (component (A)) | Complex D | Complex B | Complex A | Complex C | Complex C | Complex C | Complex C | Complex D |
| Ethylene pressure [MPa] | 0.22 | 0.22 | 0.15 | 0.15 | 0.15 | 0.15 | 0.3 | 0.22 |
| Polymerization time [min] | 110 | 155 | 60 | 110 | 60 | 120 | 120 | 40 |
| Yield [g] | 70 | 63 | 50 | 48 | 40 | 65 | 70 | 38 |
| Number-average molecular weight (Mn) [×$10^3$] | 39 | 45 | 9.5 | 45 | 56 | 31 | 87 | 10 |
| Weight-average molecular weight (Mw) [×$10^3$] | 116 | 129 | 46 | 179 | 146 | 107 | 344 | 23 |
| Molecular weight distribution (Mw/Mn) | 3.33 | 2.85 | 4.85 | 3.9 | 2.6 | 3.37 | 3.94 | 2.5 |
| Percentage of non-conjugated olefin unit [mass %] | 19.3 | 10.8 | 34.7 | 18.7 | 15.3 | 24.9 | 11.8 | 27.5 |
| Percentage of conjugated diene unit [mass %] | 15.5 | 7.3 | 3.8 | 23.1 | 19.4 | 8.3 | 26.6 | 6.7 |
| Percentage of ethylene unit [mass %] | 65.2 | 81.8 | 61.5 | 58.1 | 65.4 | 66.9 | 61.6 | 65.8 |
| 3,4-Vinyl bond content [mol %] | 56.6 | 37.4 | 43.9 | 58.5 | 53.7 | 50.8 | 54.5 | 38.6 |
| 3,4-Vinyl bond content (in copolymer) [mass %] | 8.8 | 2.7 | 1.7 | 13.5 | 10.4 | 4.2 | 14.5 | 2.6 |
| Melting point (Tm) [° C.] | 104.8 | 109.1 | 83.3 | 56.6 | 82.9 | 71.6 | 102.9 | 87 |
| Degree of crystallinity [%] | 18.7 | 36.5 | 10.3 | 8.7 | 16.3 | 20.1 | 18.9 | 1.6 |

It is understood from the above that, by using a polymerization catalyst composition containing at least the component (A), it is possible to produce a multicomponent copolymer by copolymerizing ethylene, a non-conjugated olefin compound having 3 to 10 carbon atoms, and a conjugated diene compound.

INDUSTRIAL APPLICABILITY

According to the present disclosure, it is possible to provide a method of producing a multicomponent copolymer, in which ethylene, a non-conjugated olefin compound having 3 to 10 carbon atoms, and a conjugated diene compound are copolymerized to produce a multicomponent copolymer.

The invention claimed is:

1. A method of producing a multicomponent copolymer, in which ethylene, a non-conjugated olefin compound having 3 to 10 carbon atoms, and a conjugated diene compound are copolymerized to produce a multicomponent copolymer having an ethylene unit, a non-conjugated olefin unit and a conjugated diene unit, comprising a step of copolymerizing the ethylene, the non-conjugated olefin compound, and the conjugated diene compound, in the presence of a polymerization catalyst composition containing a rare earth element compound, which is referred to as component (A), represented by the following general formula (I):

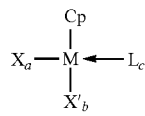
(I)

where M is a scandium, yttrium or lanthanoid element; Cp is a group selected from the group consisting of a cyclopentadienyl group, an indenyl group, a fluorenyl group, and derivatives thereof; X and X' are a hydrogen atom, a halogen atom, an alkoxide group, a thiolate group, an amide group, a silyl group, or a hydrocarbon group having 1 to 20 carbon atoms, where the hydrocarbon group having 1 to 20 carbon atoms may have a group containing silicon, oxygen, nitrogen, sulfur, or phosphorus at a terminal or between terminals; X and X' may be the same with or different from each other; a and b are each independently an integer from 0 to 3, where a+b≥1; L is a neutral Lewis base; and c is an integer from 0 to 3, wherein the non-conjugated olefin compound is at least one selected from the group consisting of 1-hexene and 1-octene, and wherein a percentage of the non-conjugated olefin unit in the multicomponent copolymer is 10.8 mass % or more.

2. The method of producing a multicomponent copolymer according to claim 1, wherein the polymerization catalyst composition further contains an organometallic compound, which is referred to as component (B), represented by the following general formula (II):

(II)

where Z is a metallic element selected from the group consisting of elements of Group 1, Group 2, Group 12, and Group 13 of the periodic table; $R^1$ and $R^2$ are a hydrocarbon group having 1 to 10 carbon atoms, or a hydrogen atom; $R^3$ is a hydrocarbon group having 1 to 10 carbon atoms; $R^1$, $R^2$, and $R^3$ may be the same with or different from each other; when Z is a metallic element of Group 1 of the periodic table, e is 1, and f and g both are 0; when Z is a metallic element of Group 2 or Group 12 of the periodic table, e and f both are 1, and g is 0; and when Z is a metallic element of Group 13 of the periodic table, e, f, and g are all 1.

3. The method of producing a multicomponent copolymer according to claim 1, wherein the polymerization catalyst composition further contains an ionic compound, which is referred to as component (C).

4. The method of producing a multicomponent copolymer according to claim 1, wherein the polymerization catalyst composition further contains a halogen compound, which is referred to as component (D).

5. The method of producing a multicomponent copolymer according to claim 1, wherein the polymerization catalyst composition further contains an aluminoxane, which is referred to as component (G).

6. The method of producing a multicomponent copolymer according to claim 1, wherein the multicomponent copolymer has a main chain consisting only of an acyclic structure.

7. The method of producing a multicomponent copolymer according to claim 1, wherein the conjugated diene compound is at least one selected from the group consisting of 1,3-butadiene and isoprene.

8. The method of producing a multicomponent copolymer according to claim 1, wherein the polymerization catalyst composition contains at least one solvent selected from the group consisting of an aromatic hydrocarbon solvent, an aliphatic hydrocarbon solvent, and an alicyclic hydrocarbon solvent.

9. The method of producing a multicomponent copolymer according to claim 1, wherein the rare earth element compound, which is component (A), is synthesized in a polymerization system in which copolymerization is performed.

10. The method of producing a multicomponent copolymer according to claim 9, wherein the rare earth element compound, which is component (A), is synthesized from a rare earth element compound, which is referred to as component (E), and a cyclopentadiene skeleton-containing compound having a group selected from the group consisting of a cyclopentadienyl group, an indenyl group, and a fluorenyl group, which is referred to as component (F), in a polymerization system in which copolymerization is performed, where the component (E) is a rare earth element compound represented by the following general formula (III):

where M is a scandium, yttrium or lanthanoid element; X, X', and X" are a hydrogen atom, a halogen atom, an alkoxide group, a thiolate group, an amide group, a silyl group, or a hydrocarbon group having 1 to 20 carbon atoms, where the hydrocarbon group having 1 to 20 carbon atoms may have a group containing silicon, oxygen, nitrogen, sulfur, or phosphorus at a terminal or between terminals; X, X', and X" may be the same with or different from each other;

a and b are each independently an integer from 0 to 3, where a+b≥1; L is a neutral Lewis base;

and c is an integer from 0 to 3.

11. The method of producing a multicomponent copolymer according to claim 1, wherein a percentage of the conjugated diene unit in the multicomponent copolymer is 26.6 mass % or less.

12. The method of producing a multicomponent copolymer according to claim 1, wherein a percentage of the ethylene unit in the multicomponent copolymer is 58.1 mass % or more.

13. The method of producing a multicomponent copolymer according to claim 1, wherein the percentage of the non-conjugated olefin unit in the multicomponent copolymer is 34.7 mass % or less.

14. The method of producing a multicomponent copolymer according to claim 1, wherein a percentage of the conjugated diene unit in the multicomponent copolymer is 3.8 mass % or more.

15. The method of producing a multicomponent copolymer according to claim 1, wherein a percentage of the ethylene unit in the multicomponent copolymer is 81.8 mass % or less.

* * * * *